(12) United States Patent
Huang et al.

(10) Patent No.: US 10,913,553 B2
(45) Date of Patent: Feb. 9, 2021

(54) INTEGRATED ABLATIVE HEAT SHIELD

(71) Applicant: NATIONAL CHUNG SHAN INSTITUTE OF SCIENCE AND TECHNOLOGY, Taoyuan (TW)

(72) Inventors: Mau-Yi Huang, New Taipei (TW); Ren-So Deng, Taoyuan (TW); Geng-Wen Chang, Taipei (TW); Dar-Ping Juang, New Taipei (TW); Cheng-Huan Wang, Taipei (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 760 days.

(21) Appl. No.: 15/813,343

(22) Filed: Nov. 15, 2017

(65) Prior Publication Data

US 2018/0186478 A1 Jul. 5, 2018

(30) Foreign Application Priority Data

Dec. 30, 2016 (TW) .............................. 105144011 A (51) Int. Cl.
*B64G 1/58* (2006.01)
*B64C 1/38* (2006.01)
(Continued)

(52) U.S. Cl.
CPC .............. *B64G 1/58* (2013.01); *B29C 70/081* (2013.01); *B64C 1/38* (2013.01); *B29C 65/02* (2013.01);
(Continued)

(58) Field of Classification Search
CPC ..... B64G 1/58; B29C 70/081; B29C 66/1282; B29C 66/1284; B29C 66/1286; B29C 66/543; B29C 66/7212; B64C 1/38
See application file for complete search history.

(56) References Cited

U.S. PATENT DOCUMENTS 3,885,071 A * 5/1975 Blad .................... B29C 37/0082
428/60
6,627,697 B2 * 9/2003 Barney ................ C09D 183/04
427/387

(Continued)

FOREIGN PATENT DOCUMENTS

TW 200611932 4/2006

*Primary Examiner* — Justin M Benedik
(74) *Attorney, Agent, or Firm* — Schmeiser, Olsen & Watts, LLP (57) ABSTRACT

An integrated heat shield which encloses a frame structure comprises a leading edge component, a left side component, a right side component, an optionally top component, an optional bottom component and an optional trailing edge subassembly, wherein the leading edge component and the left and right side components are directly, integrally co-cured on the frame structure while in a B-stage. The leading edge component and the left and right side components are shingle laminated to form ply angles to air flow. The leading edge component and the side components are scarf-jointed or step-jointed. The side components and trailing edge subassembly are also scarf jointed or step-jointed. The co-curing as well as the scarf or step joints makes the heat shield an integrated assembly. A method of manufacturing the integrated heat shield is further introduced.

11 Claims, 10 Drawing Sheets

(51) Int. Cl.
    *B29C 70/08*     (2006.01)
    *B29C 65/00*     (2006.01)
    *B29C 65/02*     (2006.01)
    *B64C 30/00*     (2006.01)

(52) U.S. Cl.
    CPC ...... *B29C 66/1282* (2013.01); *B29C 66/1284* (2013.01); *B29C 66/1286* (2013.01); *B29C 66/543* (2013.01); *B29C 66/7212* (2013.01); *B29C 66/73754* (2013.01); *B32B 2307/304* (2013.01); *B32B 2307/3065* (2013.01); *B32B 2605/18* (2013.01); *B64C 30/00* (2013.01)

(56) References Cited

U.S. PATENT DOCUMENTS

| | | | |
|---|---|---|---|
| 9,283,711 B1* | 3/2016 | Brewer | B29C 65/4835 |
| 2002/0130216 A1* | 9/2002 | Facciano | F02K 9/90 |
| | | | 244/3.24 |
| 2017/0158877 A1* | 6/2017 | McKnight | C09D 179/00 |
| 2018/0186478 A1* | 7/2018 | Huang | B64G 1/58 |

* cited by examiner (PRIOR ART)

FIG. 1

(PRIOR ART)

INTEGRATED ABLATIVE HEAT SHIELD

CROSS-REFERENCE TO RELATED APPLICATION

This non-provisional application claims priority under 35 U.S.C. § 119(a) on Patent Application No(s). 105144011 filed in Taiwan, R.O.C. on Dec. 30, 2016, the entire contents of which are hereby incorporated by reference.

FIELD OF THE INVENTION

The present invention relates to heat shields and methods of manufacturing the same and, more particularly, to an integrated ablative heat shield and a method of manufacturing the same.

BACKGROUND OF THE INVENTION

The environmental temperature around a hypersonic vehicle is as high as 1000° C. due to aero dynamic heating, and the temperature at leading edges of control fins is even higher (exceeds 1500° C.). The metallic structure of control fins will not survive from such hostile condition without heat shields.

Figure 1:
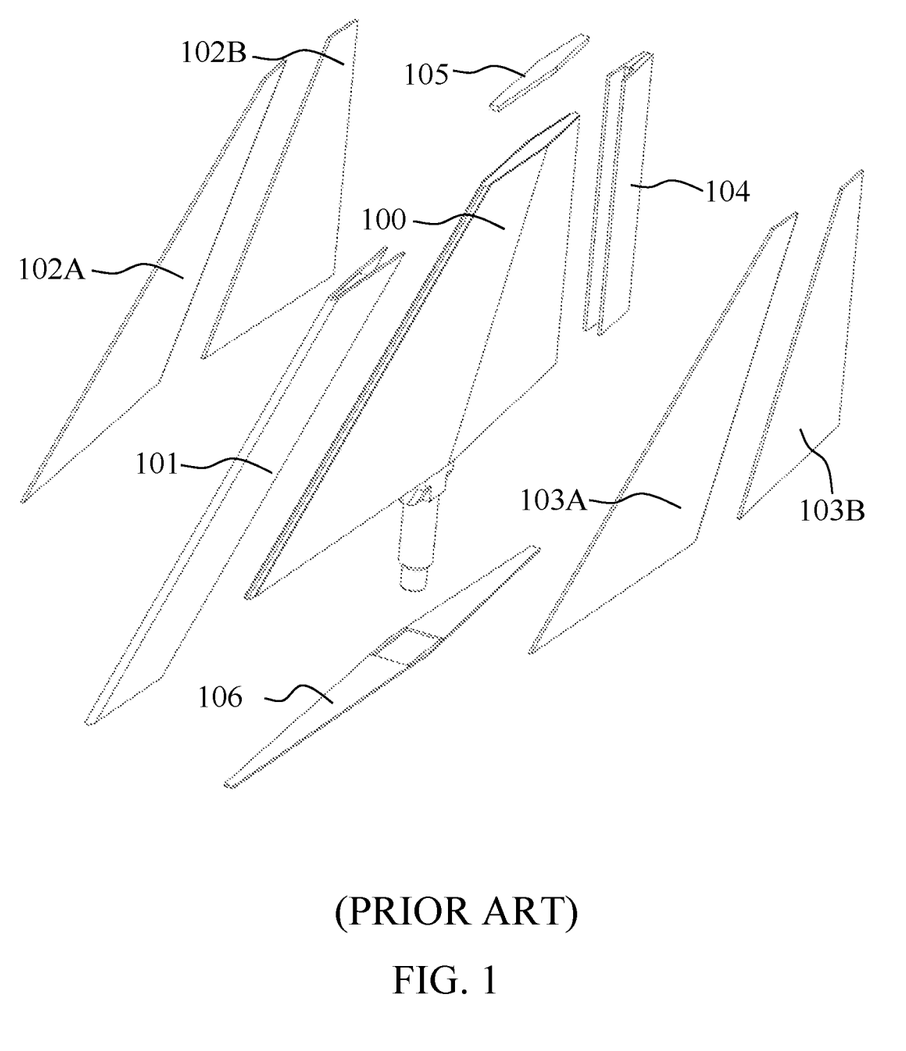
FIG. 1 (PRIOR ART) is a schematic view of a conventional heat shield.
Figure 2:
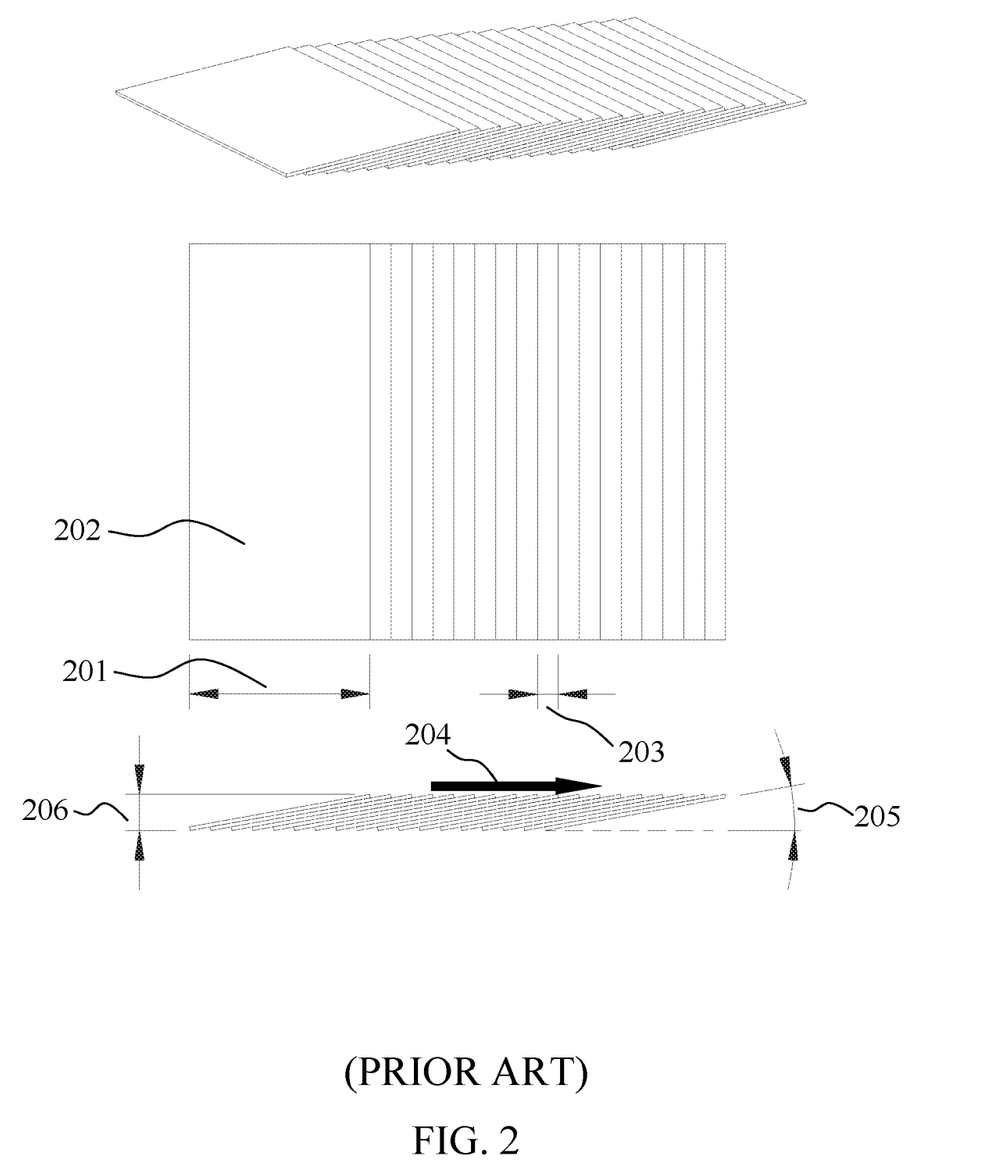
FIG. 2 (PRIOR ART) is a schematic view of shingled lamination.

The main process for applying heat shields to control fins is to separately fabricate then bond heat shield panels to the basic frame structure, which is a costly and low-reliability operation. As shown in FIG. 1, the exterior of a frame structure 100 is bonded with ablative components, including but not limited to a leading edge component 101, a front left side panel 102A, a rear left side panel 102B, a front right side panel 103A, a rear right side panel 103B, a trailing edge subassembly 104, a top component 105, and a bottom component 106. The leading edge component and the side components will be subjected to extremely hot air flow load. It is known by people skilled in the art that a ply angle is required for ablative parts to resist erosion resulting from high-speed hot air flow. As shown in FIG. 2, ply units 202 of same width 201 are arranged at an interval 203 to form a ply angle 205 to hot air flow 204. The leading edge component and the side components are separately manufactured because they are made of different types of fibers and arranged in different directions to achieve optimal performance. The laminate thickness 206 is dependent on the width 201 and interval 203. When the lamination is hot pressed to cure by molding, precise arrangement, a sophisticated process, and a strict quality control procedure are required to achieve consistence in quality. Prior to being assembled, the individual ablative components must be precisely machined to dimensions to prevent interference or overly wide gaps therebetween. Moreover, since the ablative components thus formed are of high rigidity, the skin of the frame structure requires high degree of flatness, otherwise the bonding pressure and bondline thickness will be unlikely to be uniform, and will lead to poor bonding quality. Furthermore, during a duty cycle of high air flow speed and extreme temperature, the side components are likely to peel off because of high thermal stress at free edges.

To solve the aforesaid problems and issues confronted in the prior art, an integrated design and process is required to eliminate gaps between ablative components, reduce the number of ablative components so as to enhance reliability and cut manufacturing costs of ablative heat shields.

SUMMARY OF THE INVENTION

In view of the aforesaid drawbacks of the prior art, it is an objective of the present invention to provide an integrated ablative heat shield, so as to enhance the encapsulation capability and mechanical strength of the heat shield, reduce the number of its components, cut its manufacturing costs, and enhance its reliability.

In order to achieve the above and other objectives, the present invention provides an integrated heat shield, which encloses a frame structure, comprising a leading edge component, a left side component, a right side component, an optional top component, an optional bottom component and an optional trailing edge subassembly, wherein the leading edge component, the left and right side components are directly, integrally co-cured and bonded to the frame structure while in a B-stage state. The leading edge component and the left and right side components are shingle laminated to form ply angles to air flow. The leading edge component and the side components are scarf-jointed or step-jointed. The left and right side components and the trailing edge subassembly are also scarf-jointed or step-jointed. The co-curing as well as the scarf or step joints makes the heat shield an integrated assembly.

The present invention further provides a method of manufacturing the integrated heat shield, comprising the steps of: (1) providing a frame structure; (2) forming a plurality of semi-cured polymeric composite components on outer surface of the frame structure, the plurality of semi-cured polymeric composite components comprising a leading edge component, a right side component, a left side component, an optional top component, an optional bottom component and an optional trailing edge subassembly, wherein at least the leading edge component, the left side component, and the right side component are shingle-laminated and scarf-jointed or step-jointed; (3) applying heat and uniform pressure to simultaneously co-cure and bond the plurality of the semi-cured polymeric composite components to the frame structure to enclose it; and (4) machining and/or polishing the integrated heat shield thus formed.

A film adhesive can be optionally applied to outer surface of the frame structure before step (2) to enhance bonding strength. In such a situation, the ablative components and the film adhesive are also co-cured.

In step (2), the tapered or stepped surfaces for joints of the leading edge component, the left side component, and the right side component are formed by shingle-laminating slices cut from prepregs according to specific flat patterns—a unique innovation to form tapered interface for scarf joints put forth by the present invention. The tapered surfaces for the scarf joints can also be prepared by well known method of cutting the shingle lamination blanks with blades and jigs.

According to the present invention, the simultaneous curing and bonding process mentioned in step (3) is implemented in an autoclave such that the semi-cured leading edge component, left side component and right side component and the interfaces therebetween are all subjected to uniform pressure with a view to obtaining consistent quality and good bonding strength, In addition, since curing and bonding are simultaneously carried out, steps of the process and thus the costs are reduced.

The ablative heat shield of the present invention has consecutively passed six times of wind tunnel test under same extreme conditions as prior art. No failure was experienced and no any part of the ablative heat shield being detached as opposed to prior art that had failed so many times due to peeling off of ablative components during development period. Hence, the heat shield and the method of manufacturing the same according to the present invention are not only convenient but are also satisfactory and reliable.

The above summary, the detailed description below, and the accompanying drawings further explain the technical means and measures taken to achieve predetermined objectives of the present invention and the effects thereof, but the scope of the present invention is not limited thereto. The other objectives and advantages of the present invention are explained below and illustrated with the accompanying drawings.

DETAILED DESCRIPTION OF THE PREFERRED EMBODIMENTS

Fine features and advantages of the present invention are described below to enable persons skilled in the art to gain insight into the technical solution disclosed in the present invention and thus implement the present invention. Furthermore, persons skilled in the art can easily understand related objectives and advantages of the present invention by referring to the disclosure contained herein, the claims, and the accompanying drawings.

The present invention provides an integrated heat shield and a method of manufacturing the same, characterized in that components, such as a leading edge and side components, are shingle laminated with tapered surface for scarf joint. The leading edge and the side components which are in a B-stage state are simultaneously cured and bonded to integrally enclose a frame structure, so as to not only cut processing costs, but also enhance strength and reliability of the heat shield.

Figure 3:
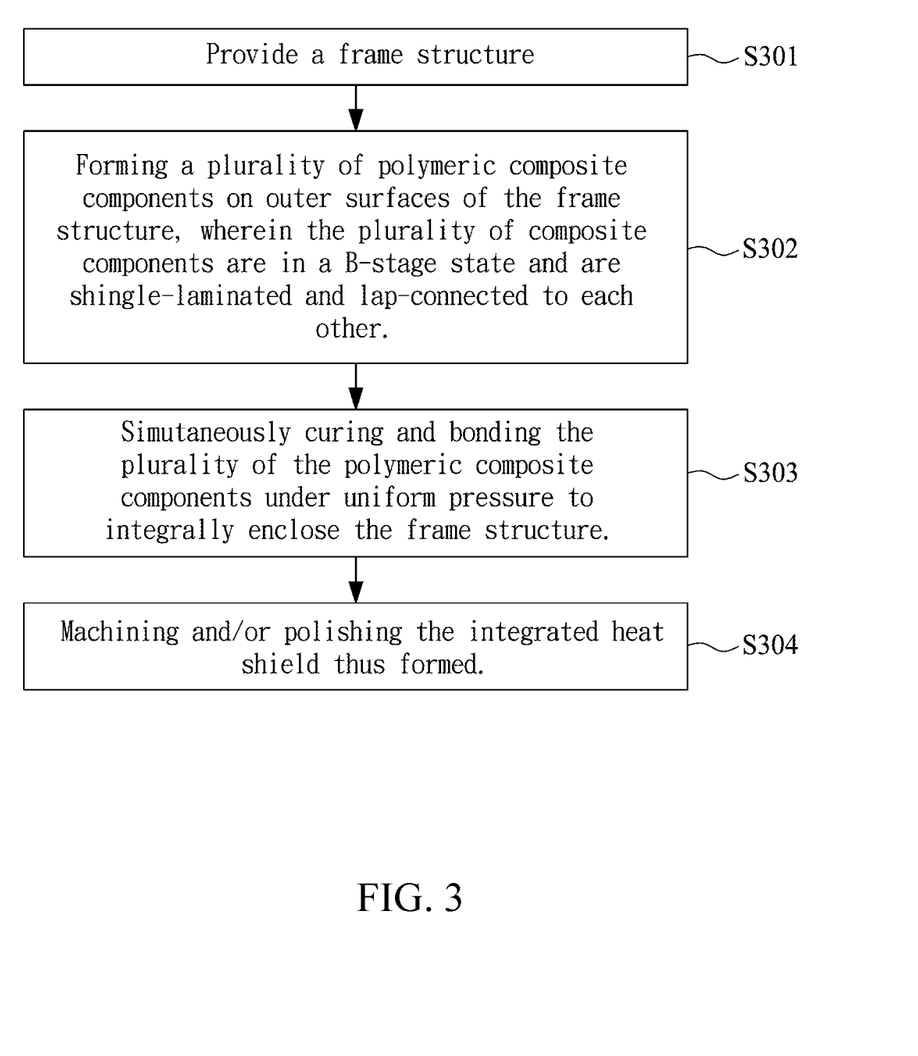
FIG. 3 is a schematic view of the process flow of a method of manufacturing an ablative heat shield according to the present invention.
Figure 4:
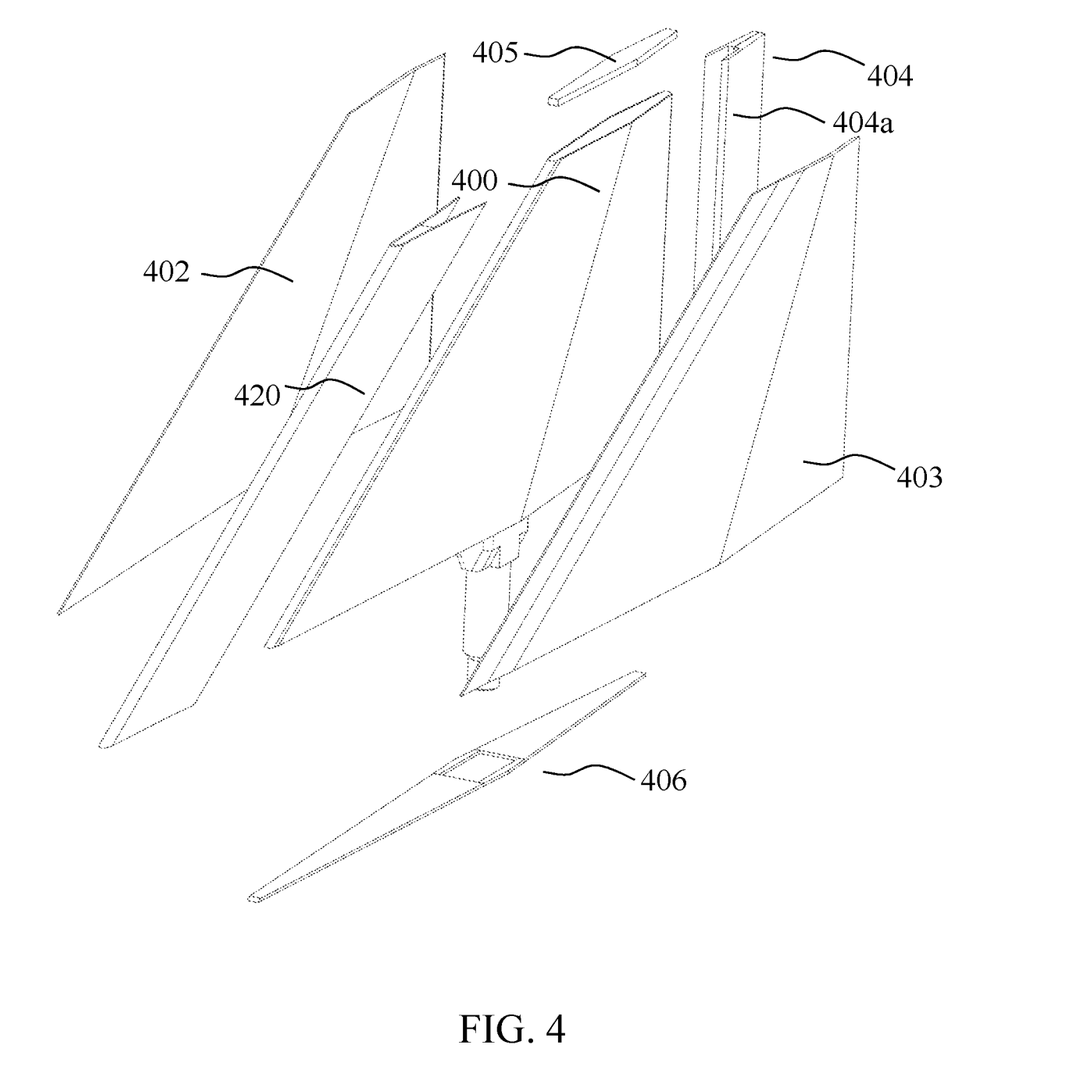
FIG. 4 is a schematic view of an integrated ablative heat shield of the present invention.

Referring to FIG. 3 and FIG. 4, there are shown schematic views of the process flow of a method of manufacturing an ablative heat shield and the integrated ablative heat shield thus manufactured according to the present invention, respectively. As shown in the diagrams, a method of manufacturing an integrated heat shield according to the present invention comprises the steps of: (1) providing a frame structure (step S301); (2) forming a plurality of polymeric composite components on outer surfaces of the frame structure, the plurality of polymeric composite components comprising a leading edge component, right side component, left side component, optionally top component, bottom component and trailing edge subassembly, wherein the leading edge component and the left and right side components are in a B-stage state and are shingle-laminated and scarf-jointed or step-jointed (step S302); (3) simultaneously curing and bonding the plurality of the polymeric composite components under uniform pressure to integratedly enclose the frame structure (step S303); and (4) machining and/or polishing the integrated heat shield thus formed (step S304).

Figure 5:
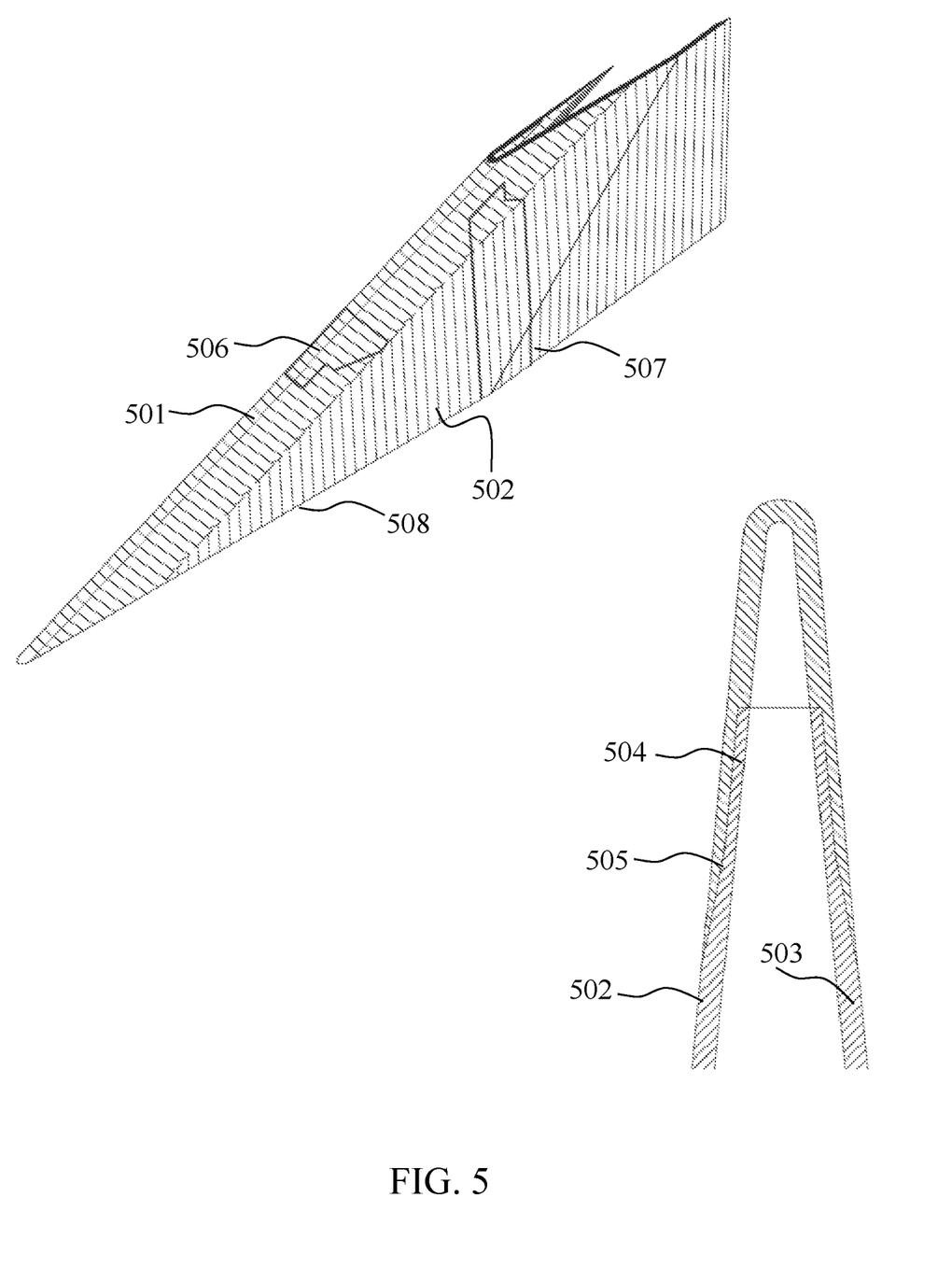
FIG. 5 is a schematic view of an exemplary scarf joint in which the parts being connected are shingle arranged according to the present invention.

Referring to FIG. 5, there is shown a schematic view of an exemplary scarf joint in which the parts being connected are shingle arranged according to the present invention. As shown in the diagram, a leading edge component 501, a left side component 502 and a right side component 503 are stepwise scarf jointed, wherein the interface surfaces include a step segment 504 and a tapered segment 505. The leading edge component and the two side components are shingle-laminated at an interval 508, respectively, by B-staged ply units 506,507 which were cut according to specific flat patterns. The specific flat patterns enable joint interfaces of the leading edge component and the two side components to form surfaces with the step segment 504 and the tapered segment 505. The aforesaid technical feature is based on the assumption that the ply units 506,507 have the same width which therefore justifies the use of the same spacing 508. In a variant embodiment, the ply units 506,507 differ in the width and thus differ in the lamination interval accordingly.

Embodiment 1

To manufacture a heat shield for a control wing of a high-speed missile, a frame structure 400 is made of stainless steel, whereas a method of producing a film adhesive involves coating a glass mesh fabric evenly with an epoxy phenol emulsion which contains aluminum powder and then baking it at 100~120° C. for 20~60 minutes.

Production of Insulating Components:

(A) To produce the trailing edge subassembly 404, top component 405 and bottom component 406, it is feasible to impregnate a style 1581 glass fabric with phenolic resin and bake it at 100~120° C. for 20~60 minutes to attain a B-stage state in order to produce a prepreg which contains 50~60% fibers by volume. Next, cut the prepreg into slices of predetermined shapes and laminate them to form blanks. Then cure the blanks by compression molding. Finally, cut the blanks according to desirable dimensions. The aforesaid process is identical to the conventional one (and thus is not reiterated herein for the sake of brevity) except that the trailing edge has a tapered surface 404a.

Figure 6:
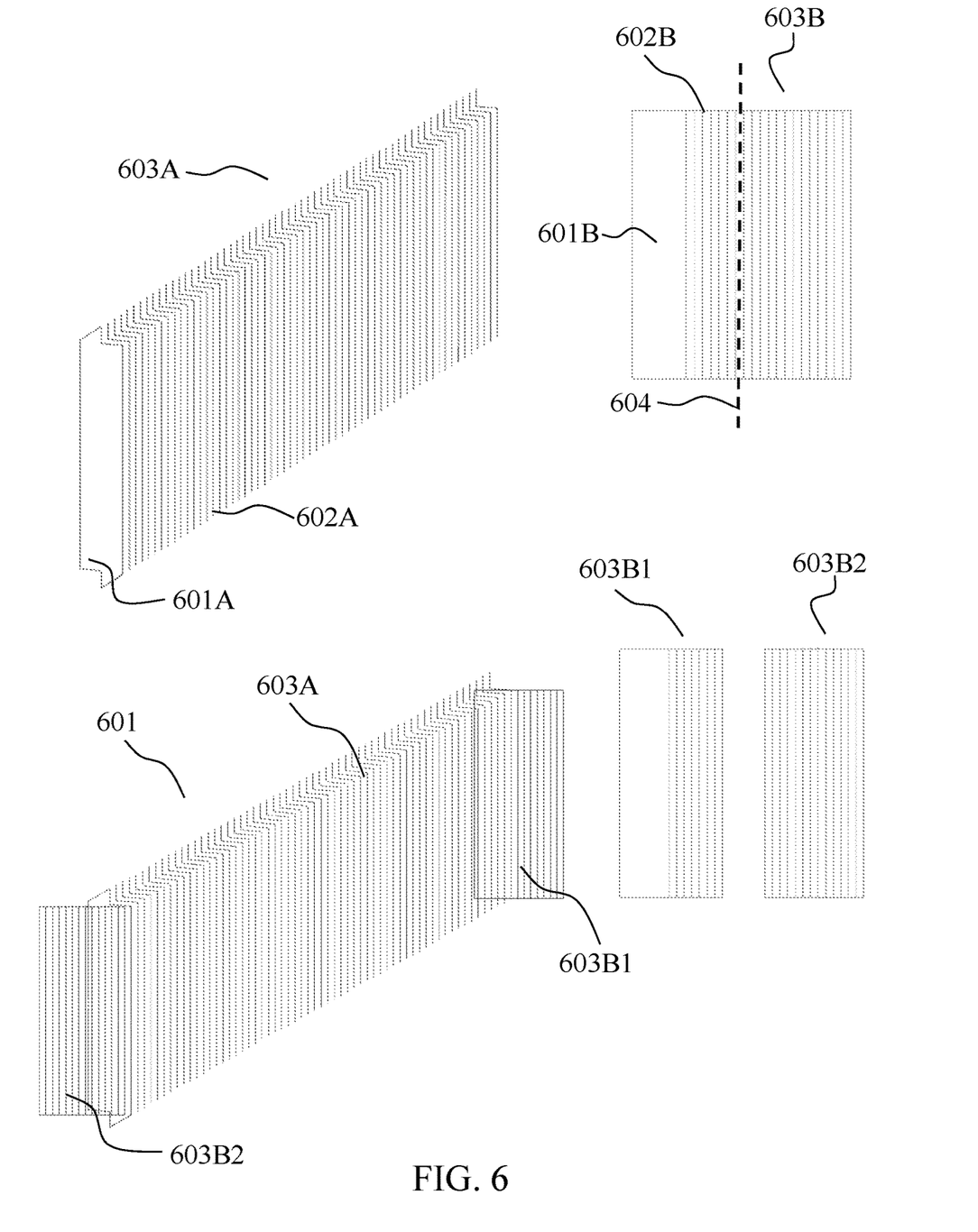
FIG. 6 is a schematic view of a shingle laminated blank of side component according to embodiment 1 of the present invention.
Figure 7:
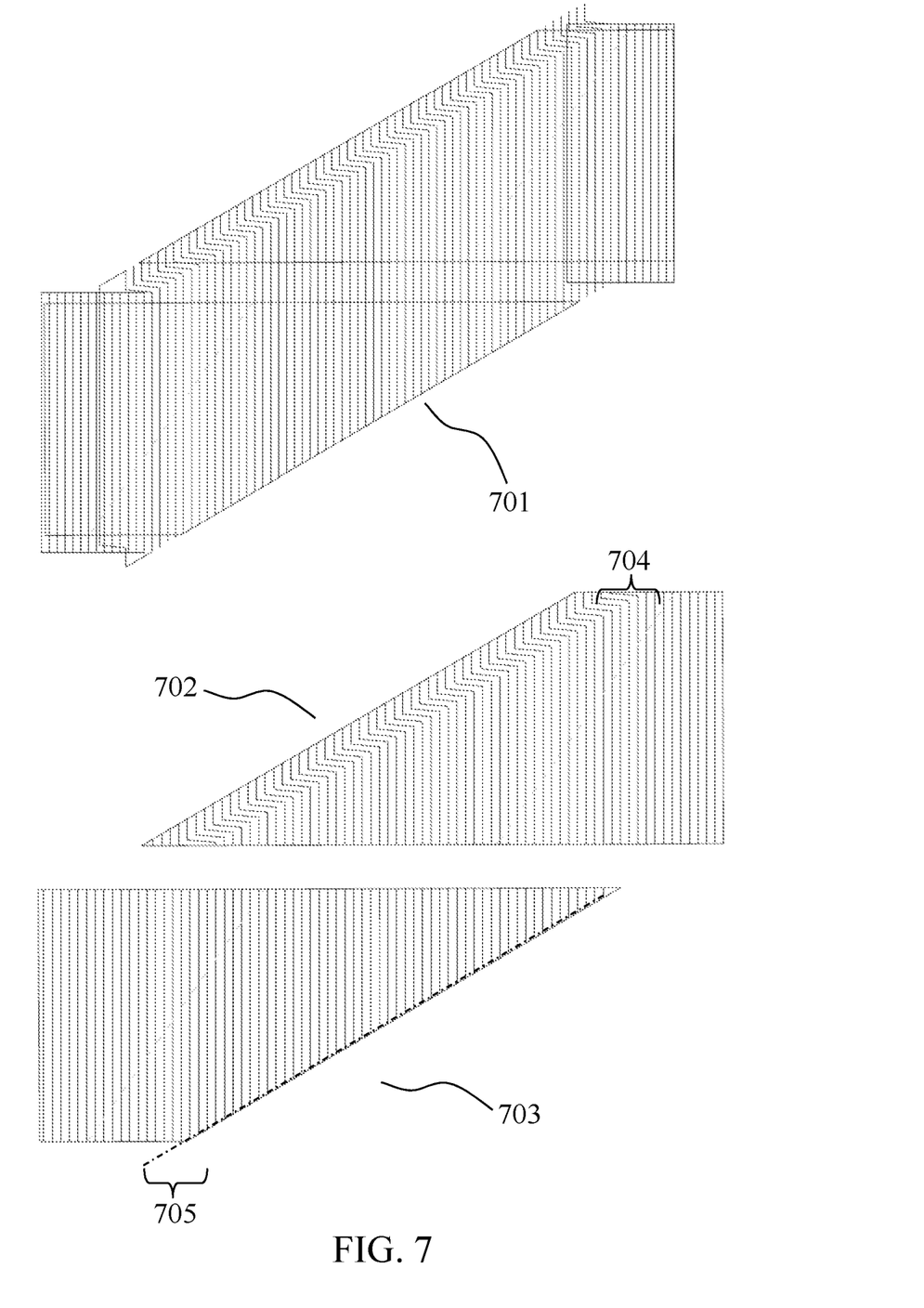
FIG. 7 is a schematic view of cutting the shingle laminated blank to obtain shingle laminated side components with tapered surfaces for scarf joint according to embodiment 1 of the present invention.

(B) To produce the left side component 402 and the right side component 403, it is also feasible to impregnate a style 1581 glass fabric with phenolic resin and bake it at 100~120° C. for 20~60 minutes to attain a B-stage state in order to produce a prepreg. The left side component 402 and the right side component 403 will be subjected to extremely harsh air flow environment. Persons skilled in the art should know that it is preferred to produce the components by shingle lamination technique and avoid gaps between them. In this regard, the present invention suggests stepwise scarf joints to eliminate gaps. In this embodiment, the joint interface between the side component and the leading edge component is composed of a step segment 504 and a tapered segment 505, as illustrated by a process described below. Referring to FIG. 6. First, cut a prepreg into a plurality of ply units 601A, 601B and shingle laminate them at equal intervals 602A, 602B to form shingled lamination assemblies 603A and 603B, respectively. Next, divide shingled lamination assembly 603B, along a cutting line 604, into two halves of equal size, namely shingled lamination assemblies 603B1 and 603B2, which are then attached at two ends of shingled lamination assembly 603A, respectively, thereby forming a side shingled lamination assembly 601. Optionally, the side shingled lamination assembly 601 is further consolidated slightly under pressure and temperature for a short duration of time to help easy handling in the following procedures. Referring to FIG. 7, the side shingled lamination assembly 601 is cut along profile line 701 into left side blanks 702 and right side blanks 703. As shown in the diagram, a stepwise tapered segment 704 is spontaneously formed at the bevel edge of left side blank 702 by shingle lamination of a plurality of ply units 601A without additional machining step which is difficult thus costly to implement. Likewise, a stepwise tapered segment 705 which lies in the back of the figure is spontaneously formed at the bevel edge of right side blank 703.

Figure 8:
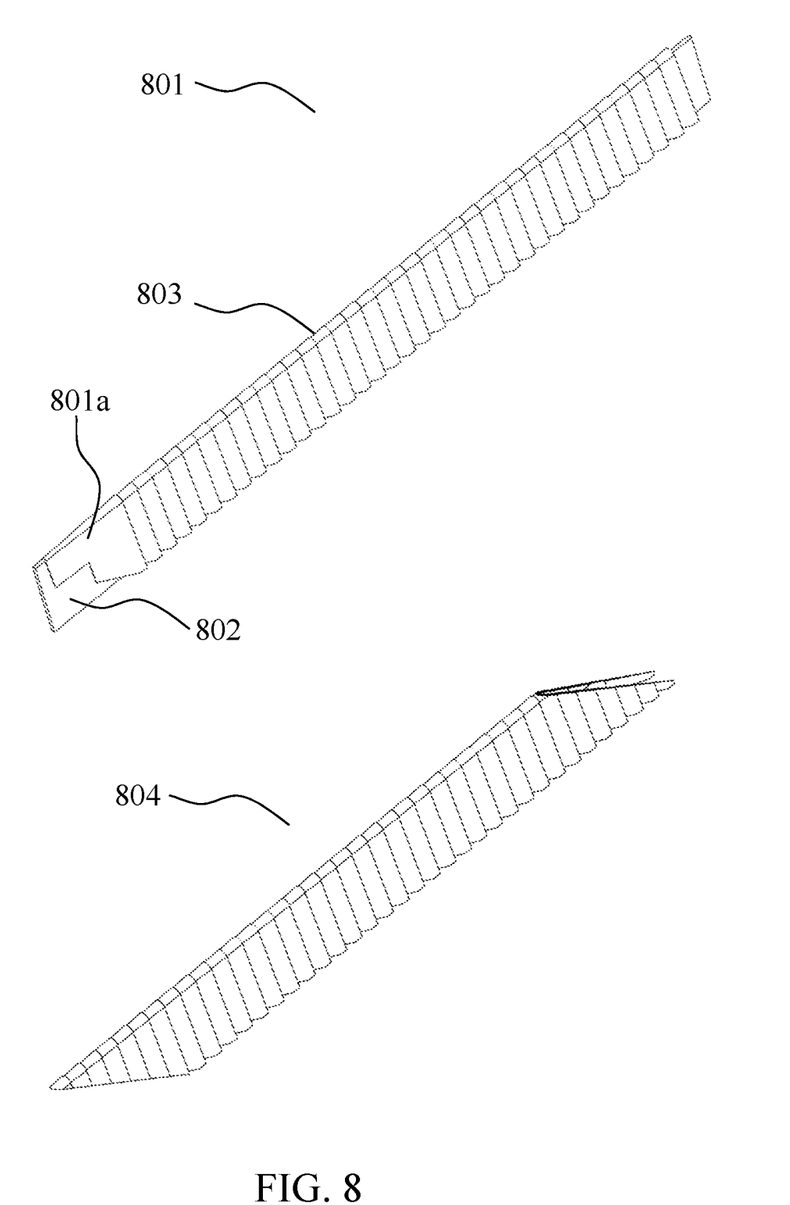
FIG. 8 is a schematic view of how to produce a shingle laminated leading edge component according to embodiment 1 of the present invention.

(C) A leading edge component 401 will be subjected to extremely high temperature and high speed air flow during a duty cycle, whereas a prepreg produced by impregnating a quartz fabric resistant to temperature above 1000° C. with phenolic resin conforming to MIL-R-9299C also has to undergo shingled lamination. Referring to FIG. 8, the quartz fabric prepreg is cut into a plurality of ply units 801 which are then each half folded as 801a and arranged at equal interval on a flat plate 802 to form a leading edge shingled lamination assembly 803. Then, the leading edge shingled lamination assembly 803 is consolidated in a mold at 50° C.~100° C. After ejected from the mold, the leading edge shingled lamination assembly 803 has its two ends cut off to obtain a leading edge blank 804. The region by which the leading edge blank 804 adjoins the left and right side blanks includes the same stepped segment 504 and tapered segment 505.

Figure 9:
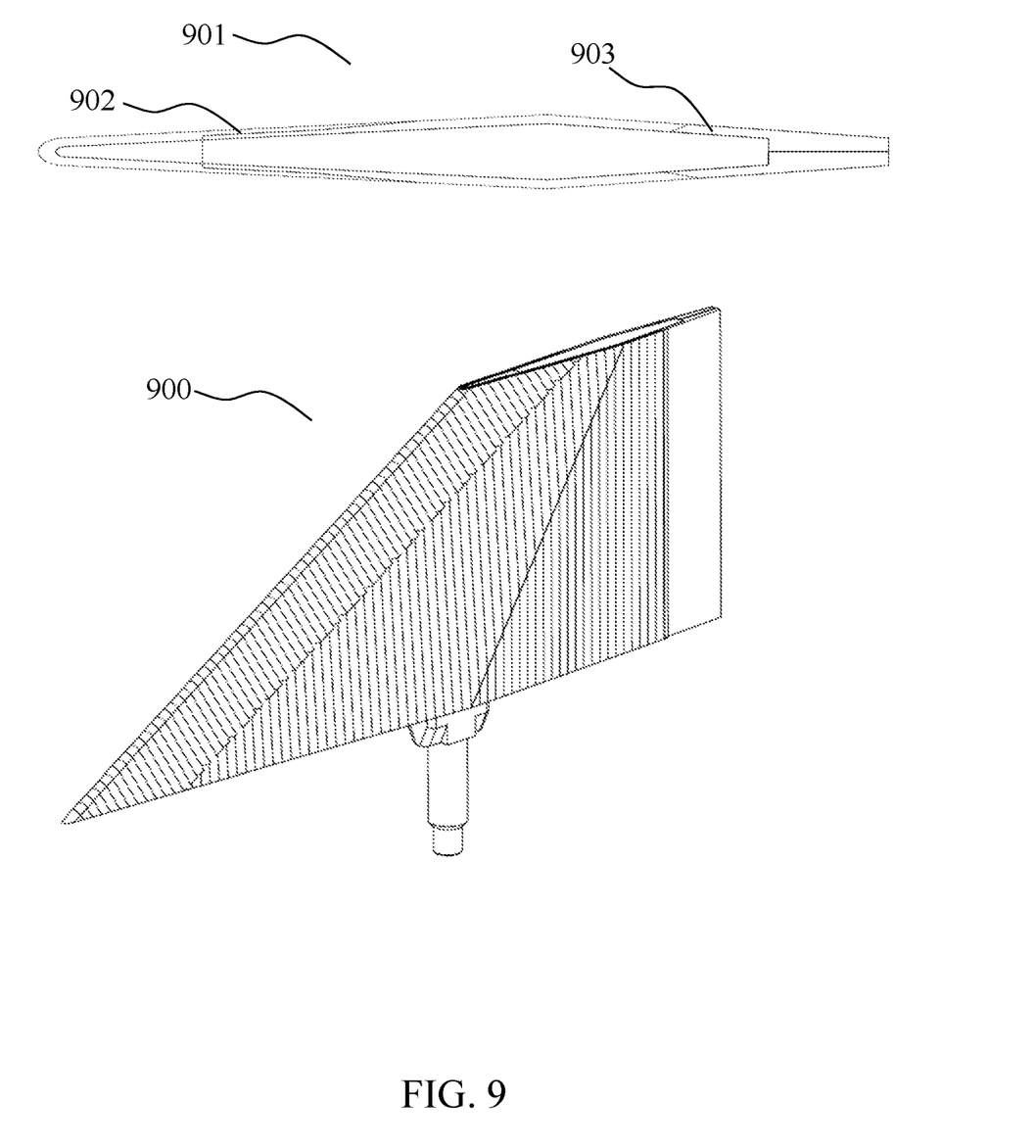
FIG. 9 is a schematic view of appearance of a finished heat shield according to embodiment 1 of the present invention.

The ablative components and blanks are produced as described above. Their assembly process is described below. The assembly process involves cutting out an adhesive film and disposing it to the outer surface of a frame structure 400, assemblying the trailing edge subassembly 404, top component 405, and bottom component 406, then assemblying the left and right side blanks 702, 70, and finally assemblying the leading edge blank 804. The finished assembly as a whole is enclosed with a release film and a breather fabric, then, packed in a vacuum bag, cured in an autoclave with the following curing cycle: apply vacuum, heat to 100~120° C. at rate of 2° C./min; apply pressure of 7~15 kg/cm$^2$; dwelled for 60~120 minutes before being heated up to 150~180° C.; kept for at least 120 minutes; and finally, remove vacuum and pressure after cooled down to 90° C. or below to complete the curing process. After separated form the vacuum bag, breather and release film, all the protruding edges and overlap portions are machined or ground off. The appearance of the finished product 900 is shown in FIG. 9. Referring to top view 901, the present invention is characterized in that, with the leading edge blank and left and right side blanks still being in a semi-cured B-stage state during the assembly process, joint interfaces 902, 903 are likely to be tapered. If the components are cured and machined then bonded together according to the prior art, the tapered surface of each component must be machined precisely which is difficult thus costly. Moreover, according to the present invention, the blanks are consolidated at much lower temperature and shorter duration than prior art and can be cut with a template in minutes instead of tedious machining procedures by a machine tool, thereby conserving energy, enhancing efficiency and cutting costs.

Embodiment 2

Figure 10:
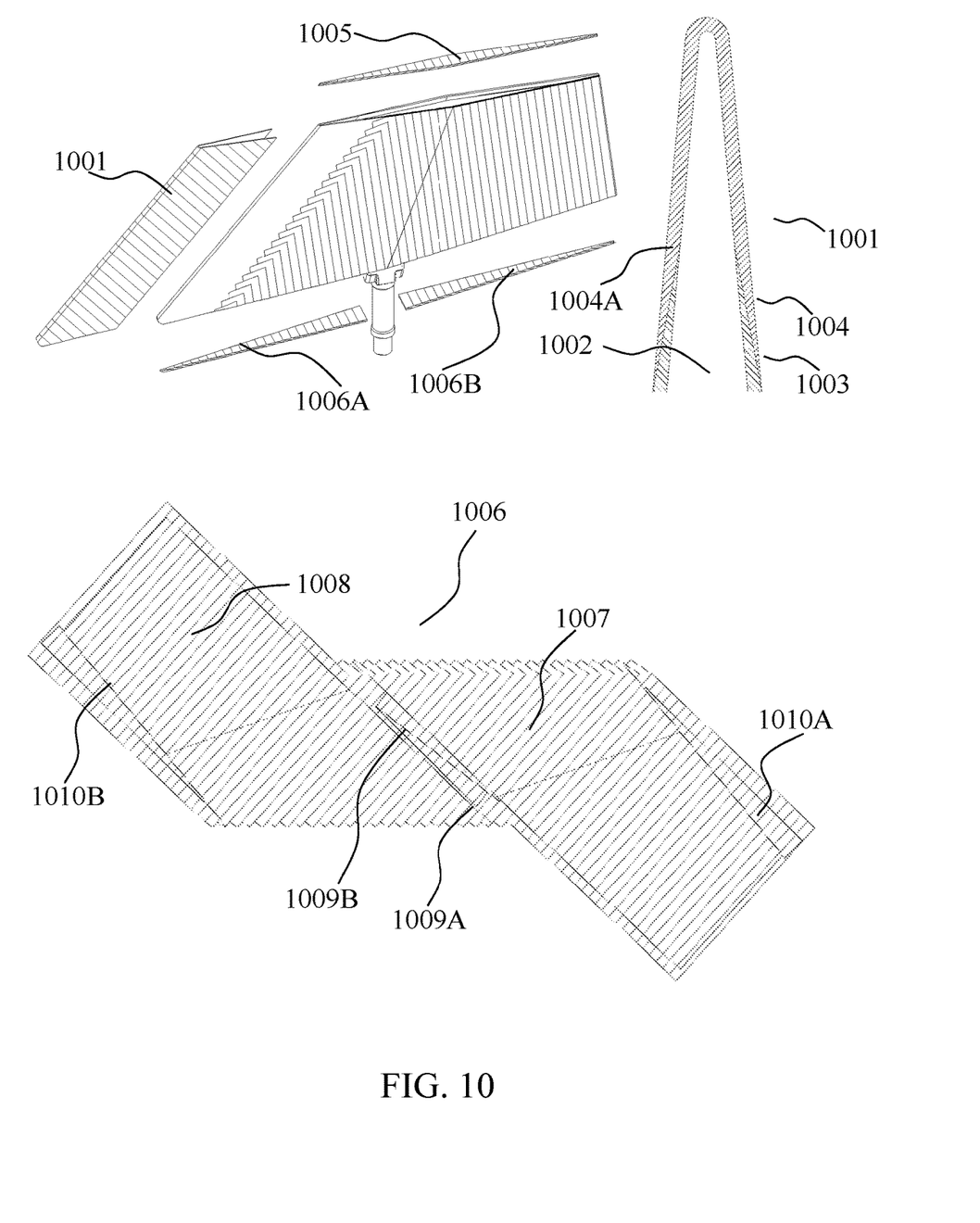
FIG. 10 is a schematic view of a heat shield according to embodiment 2 of the present invention.

Embodiment 2 applies to situations with a lower heat load than embodiment 1; hence, embodiment 2 necessitates mild alterations in applicable materials and processes with a view to cutting costs further. Embodiment 2 is distinguished from embodiment 1 by technical features described below. In embodiment 2, the leading edge component is produced from a prepreg produced by impregnating a silica fabric with phenolic resin, whereas the other components are produced from a prepreg produced by impregnating a cotton fabric with rubber-modified phenolic resin. Referring to FIG. 10, a leading edge component 1001 shares tapered surfaces 1004, 1004A with left and right side components 1002, 1003. The left and right side components 1002, 1003 extend backward to end of the frame structure 1000 and combined there such that no trailing edge subassembly is needed. The top component 1005, bottom components 1006A, 1006B, the left and right side components 1002, 1003, and the leading edge component 1001 are simultaneously cured and bonded to the frame structure. The left and right side blanks 1007, 1008, upper edge blanks 1009A, 1009B, and lower edge blanks 1010A, 1010B are all cut from the same semi-cured shingled lamination blank 1006. It has been proved that cotton fabric impregnated with rubber-modified phenolic resin can be well bonded to the frame structure, so embodiment 2 only requires film adhesive to be disposed between the leading edge component 1001 and the frame structure 1000.

Although the present invention is disclosed above by preferred embodiments, the preferred embodiments are not restrictive of the present invention. Changes and modifications made by persons skilled in the art to the preferred embodiments without departing from the spirit and scope of the present invention must be deemed falling within the scope of the present invention. Accordingly, the legal protection for the present invention should be defined by the appended claims.

What is claimed is:

1. An integrated heat shield made of a plurality of polymeric composite components which enclose a frame structure, the polymeric composite components comprising a leading edge component, a left side component, a right side component, an optional top component, an optional bottom component and an optional trailing edge subassembly, wherein at least the leading edge component, the left and right side components are scarf-jointed, step-jointed or stepwise scarf-jointed, then simultaneously cured and bonded to integrally enclose the frame structure while in a B-stage state.

2. The integrated heat shield of claim 1, wherein a film adhesive is disposed between the frame structure and the leading edge component, left side component, right side component, bottom component and trailing edge assembly to enhance bonding strength.

3. The integrated heat shield of claim 1, wherein the polymeric composite is phenolic resin based.

4. The integrated heat shield of claim 1, wherein the polymeric composite is rubber-modified phenolic resin based.

5. The integrated heat shield of claim 1, wherein the polymeric composite is reinforced by one selected from the group consisting of carbon fiber, silicon fiber, glass fiber, quartz fiber, cotton fabric and a combination thereof.

6. A method of manufacturing the integrated heat shield of claim 1, the method comprising the steps of:
- (1) providing a frame structure;
- (2) forming a plurality of semi-cured polymeric composite components on outer surface of the frame structure, the plurality of semi-cured polymeric composite components comprising a leading edge component, a right side component, a left side component, an optional top component, an optional bottom component and an optional trailing edge subassembly, wherein at least the leading edge component, the left side component, and the right side component are shingle-laminated and scarf-jointed or step-jointed to each other;
- (3) applying heat and uniform pressure to simultaneously cure and bond the plurality of semi-cured polymeric composite components to the frame structure to enclose it; and
- (4) machining and/or polishing the integrated heat shield thus formed.

7. The method of claim 6, further comprising disposing a film adhesive to outer surfaces of the frame structure prior to step (2).

8. The method of claim 6, wherein the tapered surfaces for scarf joints and stepped surfaces for step joints of the leading edge component, the left side component, and the right side component are formed by shingle-laminating slices cut from prepregs according to specific flat patterns.

9. The method of claim 6, wherein the tapered surfaces for scarf joints of the leading edge component, the left side component, and the right side component are formed by cutting shingled lamination blanks with razor blades and jigs.

10. The method of claim 6, wherein, before being assembled to outer surfaces of the frame structure, the leading edge component is consolidated at much lower temperature and shorter duration than its curing temperature and time.

11. The method of claim 6, wherein, before being assembled to outer surfaces of the frame structure, the left side component and the right side component are consolidated at much lower temperature and shorter duration than their curing temperature and time respectively.

\* \* \* \* \*